April 14, 1931.  J. W. GILSON  1,801,148
CUP HOLDER FOR THERMOS LUNCH KITS
Filed Sept. 25, 1928

INVENTOR.
John W. Gilson.
BY
Lacey & Lacey, ATTORNEYS

Patented Apr. 14, 1931

1,801,148

UNITED STATES PATENT OFFICE

JOHN WHITHAM GILSON, OF OAK PARK, ILLINOIS

CUP HOLDER FOR THERMOS LUNCH KITS

Application filed September 25, 1928. Serial No. 308,296.

This invention relates to an improved cup holder intended for use in conjunction with lunch kits, the lids of which rest in horizontal position when opened.

One object of the invention is to provide a device attached to a lunch kit for holding the cup shaped cap normally carried on a thermos bottle in the kit.

Another object of the invention is to provide a cup holder hinged to the lid of the lunch kit and which may be swung into said kit when not in use.

A further object of the invention is to provide a cup holder having means for limiting it in a horizontal position on the end of the lunch kit in position for use.

Other objects of the invention not specifically mentioned in the foregoing will appear during the course of the following description.

In the drawing:—

Figure 1:
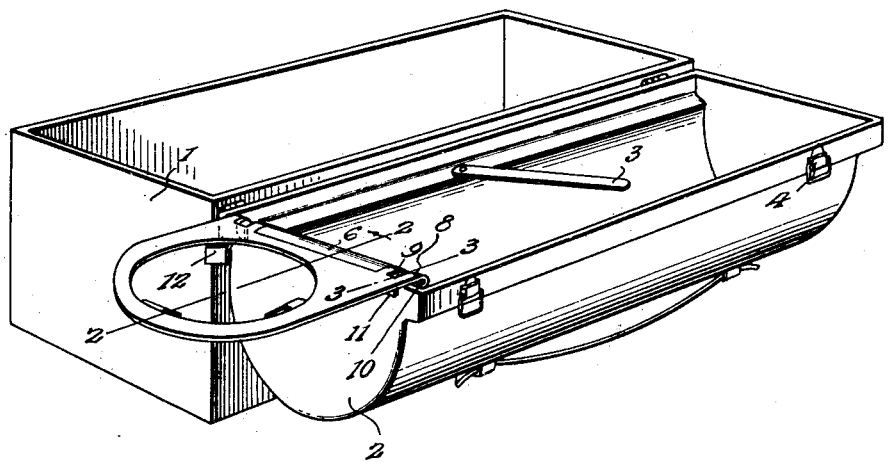
Figure 1 is a perspective view showing the device attached to a lunch kit.
Figure 3:
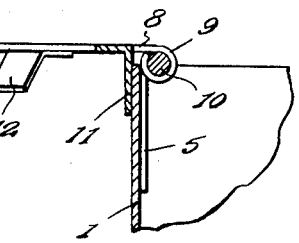
Figure 3 is a fragmentary sectional view taken on the line 3—3 of Figure 1 looking in the direction indicated by the arrows.
Figure 2:
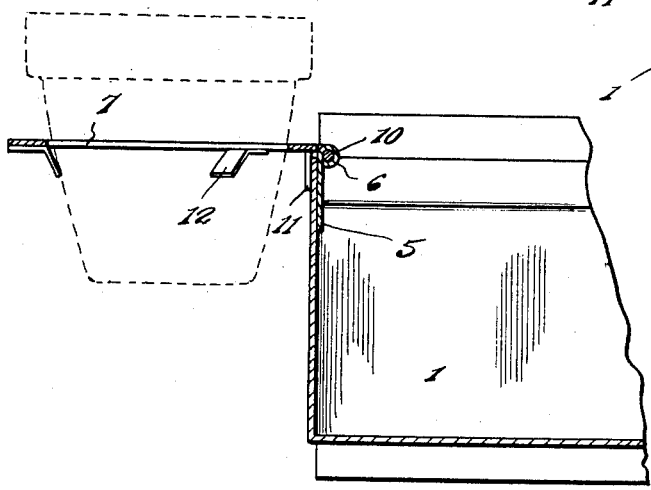
Figure 2 is a fragmentary sectional view taken on the line 2—2 of Figure 1, looking in the direction indicated by the arrows.

Referring more particularly to the drawing, the numeral 1 indicates a substantially rectangular box of a lunch kit, and hinged to one side wall of said box is a lid 2 which is hemispherical in cross section to receive a thermos bottle. The lid is provided with a swinging clip 3 for holding said thermos bottle in position therein, as well as means 4 for removably securing the lid in closed position.

Mounted on one end wall of the lid 2 is a plate 5 having the upper edge thereof extending past the end of the lid and rolled to form a hinge loop 6. Swingingly connected to said plate is a substantially circular bracket 7 having tangential lugs 8 rolled at the outer ends thereof to form pairs of aligned hinge loops 9. Extending through the loops 6 and 9 is a pin 10 pivotally supporting the bracket.

Formed at the base of the hinge loops 9 and disposed between each pair thereof are stop lugs 11 bent downwardly at right angles to the bracket 7 for engagement with the adjacent end wall of the lid to support said bracket in horizontal active position. Appropriately secured to the lower face of the bracket 7 are downwardly converging retaining fingers 12, formed preferably of spring material, said fingers forming means for grasping a cup and holding it firmly in position on the bracket.

In use the device is attached to either end of the lid of a lunch kit, and is, when not in use, swung inwardly to a position substantially within the lines of the lid overlying a thermos bottle carried in the lid. If it is desired to hold a cup or the like in the device, the bracket is swung outwardly to a horizontal position as shown in Figure 1, where it will be sustained by the stop lugs 11. A cup may then be placed in the opening of the bracket to be held firmly therein so that accidental spilling of a liquid carried in the cup will be prevented.

Having thus described the invention, I claim:

A cup holder including, in combination with a container having a hinged lid provided with an end wall, a plate extending transversely of said end wall at its free margin and provided with a hinge loop, a substantially circular bracket, tangential lugs rolled to form pairs of spaced aligned hinge loops, a pair of said lugs being disposed at each end of said bracket, and a pin extending through all of the loops and hingedly connecting the bracket with the plate, the material of the bracket between said pairs of lugs being disposed at right angles to said bracket to form depending stop lugs adapted to engage said end wall for sustaining the weight of the bracket in active position projecting from said end wall exteriorly of the lid.

In testimony whereof I affix my signature.

JOHN WHITHAM GILSON. [L. S.]